United States Patent
Penavaire et al.

(10) Patent No.: US 7,549,791 B2
(45) Date of Patent: Jun. 23, 2009

(54) REMOTELY TESTABLE TEMPERATURE SENSOR

(75) Inventors: Louis Penavaire, Nice (FR); Marc Solal, Longwood, FL (US); Thomas Pastureaud, Mougins-le-Haut (FR)

(73) Assignee: Senseor (FR)

( * ) Notice: Subject to any disclaimer, the term of this patent is extended or adjusted under 35 U.S.C. 154(b) by 197 days.

(21) Appl. No.: 10/584,278

(22) PCT Filed: Dec. 10, 2004

(86) PCT No.: PCT/EP2004/053401
§ 371 (c)(1), (2), (4) Date: Jul. 18, 2007

(87) PCT Pub. No.: WO2005/071375
PCT Pub. Date: Aug. 4, 2005

(65) Prior Publication Data
US 2007/0274371 A1  Nov. 29, 2007

(30) Foreign Application Priority Data
Dec. 24, 2003  (FR) .................................. 03 15351

(51) Int. Cl.
*G01K 11/26* (2006.01)
(52) U.S. Cl. ...................................... 374/117; 310/313
(58) Field of Classification Search ................. 374/117; 310/313
See application file for complete search history.

(56) References Cited
U.S. PATENT DOCUMENTS
5,020,034 A  5/1991  Solal et al.
5,432,392 A *  7/1995  Kadota et al. ............ 310/313 A
5,475,348 A  12/1995  Hode et al.
5,703,427 A  12/1997  Solal et al.
5,936,487 A  8/1999  Solal et al.

(Continued)

FOREIGN PATENT DOCUMENTS
EP       1 324 489 A      7/2003

OTHER PUBLICATIONS

Buff W et al : "Universal Pressure and Temperature Saw Sensor for Wireless applications" Proceeding of the 1997, IEEE Ultrasonic Symposium, Ontario, Canada Oct. 5-8, 1997 IEEE Ultrasonic Symposium. Ontario Canada Oct. 5-8, 1997 IEEE Ultrasonic Symposium Proceedings New York, NY: IEEE, US Oct. 5, 1997.
W. Buff et al; Universal Pressure and Temperture Saw Sensor for Wireless Applications; 1997 IEEE Ultrasonics Symposium; pp. 359-362.

(Continued)

*Primary Examiner*—Andre J Allen
(74) *Attorney, Agent, or Firm*—Lowe Hauptman Ham & Berner, LLP

(57) ABSTRACT

The invention relates to a remotely interrogable SAW (surface acoustic wave) temperature sensor comprising. At least two resonators (T1, $_{saw}$, T2, $_{saw}$) have transducers having interdigitated electrodes connected to control buses of design such that they have different characteristic operating frequencies. A first resonator has a first surface acoustic wave propagation direction, parallel to one of the axes of the substrate, and a second resonator has a surface acoustic wave propagation direction making a nonzero angle ($\beta$) with the propagation direction of the first resonator. The control buses of the second transducer are inclined at a nonzero angle ($\gamma$) to the normal to the interdigitated electrodes of the second transducer so as to compensate for the power flow divergence of the acoustic waves along the second transducer.

14 Claims, 5 Drawing Sheets

U.S. PATENT DOCUMENTS

| | | | |
|---|---|---|---|
| 5,953,433 A * | 9/1999 | Fujimoto et al. | 381/337 |
| 6,011,344 A | 1/2000 | Dufilie et al. | |
| 6,043,726 A | 3/2000 | Solal et al. | |
| 6,150,900 A * | 11/2000 | Kadota et al. | 333/133 |
| 6,316,861 B1 | 11/2001 | Ballandras et al. | |
| 6,317,014 B1 * | 11/2001 | Kadota | 333/133 |
| 6,344,705 B1 | 2/2002 | Solal et al. | |
| 7,126,251 B2 | 10/2006 | Solal et al. | |
| 2002/0079989 A1 | 6/2002 | Kadota et al. | |

OTHER PUBLICATIONS

U.S. Appl. No. 523 054, filed Aug. 15, 1983 (Abandoned).
U.S. Appl. No. 647 883, filed Sep. 6, 1984 (Abandoned).
U.S. Appl. No. 08/338,448, filed Mar. 4, 1994, Solal (Abandoned).
Ventura, P. et al. "A New Accurate Analysis of Periodic IDTs Built on Unconventional Orientation on Quartz", 1997, IEEE Ultrasonics Symp., pp. 139-142.

* cited by examiner

— θ=32°
--- θ=34°
-.- θ=36°
-x- θ=38°
...... θ=40°
— θ=42°

FIG.8
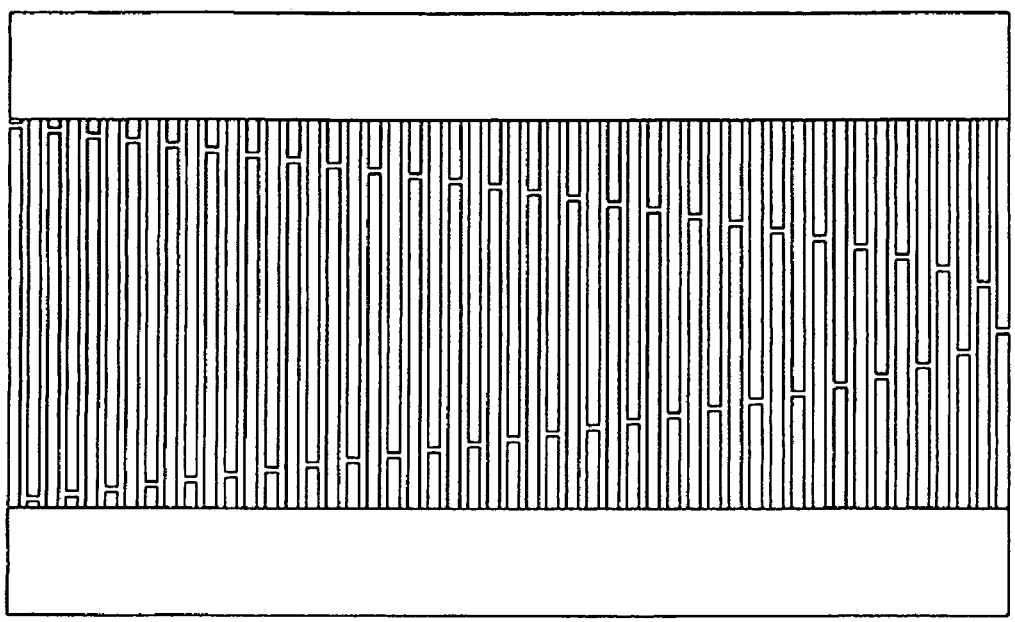
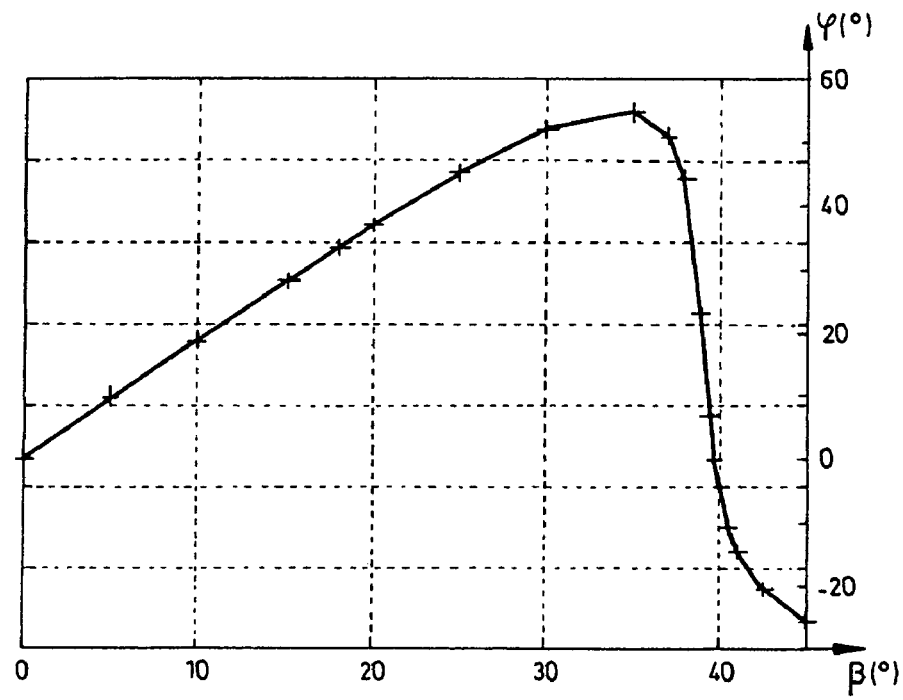
FIG.9

REMOTELY TESTABLE TEMPERATURE SENSOR

Sensors based on surface acoustic waves have been known since the 1970s. The principle is that of measuring the variation in frequency or in delay of a SAW (surface acoustic wave) device. The stresses applied to the substrate result in a deformation of the latter and a variation in the velocity of the surface waves. If a device is produced on the surface of the substrate, these mechanical effects will result in a variation in the central frequency of the device and a variation in its delay. Temperature variations give similar effects (expansion and change in velocity). One standard principle is to produce a resonator on the surface of the substrate since, owing to the very small bandwidth of this type of device, the frequency variations can be accurately measured. A surface acoustic wave resonator consists of an interdigitated-comb transducer T placed between two reflector arrays $RA_1$ and $RA_2$, as illustrated in FIG. 1. The reflector arrays behave as mirrors and there therefore exist resonant frequencies for which the round-trip path in the cavity is equal to an integral number of wavelengths. The resonant modes for these frequencies are excited by the transducer placed between the mirrors.

The resonant frequencies correspond to rapid variations in the admittance of the component.

The possibility of remotely interrogating surface-wave-based sensors is also known. The principle is that of connecting the input of the transducer to a radiofrequency antenna. When the antenna receives an electromagnetic signal, this gives rise to waves over the surface of the substrate which are themselves converted into electromagnetic energy on the antenna. Thus, the device, consisting of a resonator connected to an antenna, has a response at the resonant frequency of the resonator and it is possible to measure this frequency remotely. It is thus possible to produce remotely interrogable sensors. This possibility is an important advantage of surface acoustic waves and is used in the context of tire pressure sensors since it is advantageous to be able to place the sensor in the tire, while the interrogating electronics are placed in the vehicle.

More precisely, sensor structures comprising a set of three resonators, as illustrated in FIG. 2, have already been proposed.

These three resonators operate at different frequencies. The measurement principle is based on a measurement of the difference in frequency between two resonators. A first resonator $R_1$ is used to obtain a reference frequency. The pressure measurement is obtained by subjecting only a second resonator $R_2$ to pressure.

Since the resonators $R_1$ and $R_2$ are at the same temperature, the frequency difference obtained between these two resonators is only proportional to the applied pressure.

Typically, if the set of resonators is produced on the surface of a quartz substrate of Y+θ cut (in the X, Y, Z crystallographic reference frame, as shown in FIG. 2), the propagation direction used is the X direction in the case of the resonators $R_1$ and $R_2$.

A third resonator $R_3$ is used under no compressive stress, but is positioned at an angle β to the X axis in order to measure the temperature, the axis of propagation of the surface acoustic waves is in this case the X' axis, making an angle β to the X axis.

All the resonators obey a quadratic frequency/temperature dependence law with a second-order coefficient ($FTC_2$) which may be considered to be the same since this second-order coefficient depends essentially on the material used. When quartz of ST cut, that is to say having a cut between Y+30° and Y+42.75°, is used, this coefficient $FTC_2$ for propagation along the X axis is about $3.3 \times 10^{-8}/°C$. In other words, if $f_0$ is the nominal central frequency of the device, its frequency f will follow, as a function of the temperature T, a law of the type:

$$\frac{f - f_0}{f_0} = FTC_2(T - T_0)^2.$$

The temperature $T_0$ corresponds to the apex of the parabola and is called the turnover temperature. It has also been shown that the 2nd order coefficient $FTC_2$ varies little when the propagation direction departs from the X axis.

In contrast, the turnover temperature of the frequency/temperature curve depends on the angle of propagation.

The frequency difference between the reference resonator (frequency $f_1$) and the inclined resonator (frequency $f_2$) is therefore proportional to the temperature. This difference follows the laws:

$$\frac{f_1 - f_{01}}{f_{01}} = FTC_2(T - T_{01})^2$$

$$\frac{f_2 - f_{02}}{f_{02}} = FTC_2(T - T_{02})^2$$

$$f_2 - f_1 \cong f_{02} - f_{01} + FTC_2(f_{02}T_{02}^2 - f_{01}T_{01}^2) - 2FTC_2(f_{02}T_{02} - f_{01}T_{01})T$$

$$f_2 - f_1 \cong \{f_2 - f_1\}(T = 0) - 2FTC_2T_{02}\frac{f_{02} + f_{01}}{2}T$$

The frequency difference is therefore proportional to the temperature multiplied by a coefficient equal to the difference in turnover temperature multiplied by twice the second-order coefficient. The sensitivity of the sensor to temperature is therefore proportional to the difference in turnover temperature. This sensitivity may also be estimated by the difference in linear temperature drift coefficients $FTC_1$ between propagation at the zero angle and propagation at a given angle. This difference in $FTC_1$ gives directly the relative frequency variation with temperature. FIG. 3 shows the behavior of this difference in $FTC_1$ in ppm/°C. for the ST cut for various operating points (thickness/degree of metallization). In these curves, a denotes the width of the electrodes, h denotes the metallization thickness of the electrodes, and p denotes the period of the electrodes. All these very similar curves show that the $FTC_1$ difference curve depends very little on the operating point since a maximum difference of 2 ppm/°C. is observed for 22 ppm/°C. for a propagation angle of 30° to X. To a first approximation, it may therefore be considered that this $FTC_1$ difference does not depend thereon. Moreover, FIG. 4 shows the variations in this $FTC_1$ difference, namely $\Delta FTC_1$, for various angles of cut θ and various angles of propagation.

It may be shown that this $FTC_1$ difference is approximated very precisely by the equation:

$\Delta FTC_1(\text{ppm}/°\text{C.}) = (0.4471 \times 10^{-3}\theta - 6.153 \times 10^{-3})\beta^2 + (0.1848 \times 10^{-6}\theta + 1.88 \times 10^{-6})\beta^4$.

In this equation, θ is the angle of cut in degrees and β is the angle of propagation in degrees. This equation therefore allows the sensitivity of the sensor to be determined.

The presence of an inclined sensor thus allows the temperature to be determined. However, a problem arises as to the divergence in power flow of the acoustic waves along the propagation direction because of the angle of inclination of the resonator to the X direction. FIG. 5 plots this divergence, which shows the angle PFA that the power flow of the surface acoustic waves makes with the propagation direction X'. If buses parallel to the propagation angle X' are used, the power flow will emerge from the transducer and the Q-factor of the resonator will be substantially degraded. FIG. 5 shows that this power flow angle or PFA can reach values as high as 5° for an angle of propagation of 20° for angles of cut θ.

To solve this problem, the present invention proposes a remotely interrogable surface acoustic wave sensor allowing temperature measurement, which comprises at least two resonators connected in parallel to an antenna and operating at different frequencies, the measurement principle being based on a measurement of the frequency difference between the first and second resonators, the second resonator being inclined to the first and possessing electrode buses inclined at an angle γ to the normal to the electrodes of said third resonator, so as to compensate for the difference between the direction of the power flow and the direction of the phase vector (i.e. the power flow angle).

More precisely, the subject of the present invention is a surface acoustic wave sensor comprising, on the surface of a quartz substrate of Y+θ cut:

at least two resonators comprising transducers consisting of interdigitated electrodes connected to control buses of design such that they have different characteristic operating frequencies; and a first resonator having a first surface acoustic wave propagation direction, parallel to one of the axes of the crystalline substrate, and a second resonator having a surface acoustic wave propagation direction making a nonzero angle with the propagation direction of the first and second resonators, characterized in that the control buses of the second transducer are inclined to the normal to the interdigitated electrodes of said second transducer so as to compensate for the power flow divergence of the acoustic waves relative to the direction of propagation of the surface acoustic waves along said second transducer.

In addition, the Applicant has shown that, for a given angle of propagation β, the power flow angle PFA as a function of the angle of cut θ and the angle of propagation β is expressed as:

$$PFA(\beta,\theta) \approx A1(\theta)\beta + A2(\theta)\beta^3 + A3(\theta)\beta^5$$

$$A1(\theta) = 0.6259 - 0.014\theta + 1.9152 \times 10^{-4}\theta^2$$

$$A2(\theta) = -5.1796 \times 10^{-4} + 1.2673 \times 10^{-5}\theta - 1.397 \times 10^{-7}\theta^2$$

$$A3(\theta) = 4.3 \cdot 10^{-8} - 4.8611 \times 10^{-9}\theta + 4.5141 \times 10^{-11}\theta^2.$$

This expression is valid for an angle of propagation β of between −30° and 30° and for an angle of cut between 30° and 45°. It makes it possible to determine the angle γ, i.e. the PFA, that the buses must make with the perpendicular to the electrodes.

Since the sensor according to the invention is designed to operate within a given frequency band, the characteristic frequencies of each of the resonators are such that they belong to said band and have a maximum frequency difference in order to maximize the sensitivity of the sensor.

Advantageously, the sensor according to the invention may operate within the ISM (Industrial Scientific and Medical) band around 434 MHz, more precisely in the band lying between 433.05 MHz and 434.79 MHz. Other ISM bands that could be used for the sensors are in the 868 MHz and 2.4 GHz ranges. The band limits and power limits depend on the local regulations. In a preferred embodiment of the invention, the substrate is a Y' cut quartz crystal making an angle θ with the crystallographic Y axis, it being possible for this angle to be between 30° and 45°, and the first resonator has a surface wave propagation direction parallel to the X axis of the crystal. The surface acoustic wave propagation direction within the second resonator may typically make an angle β of less than 30° to the X direction, this angle possibly being between 14° and 22°.

In this configuration, the angle γ of the control buses for the second resonator relative to the wave propagation direction may typically be between 5° and 6°.

In the case of a sensor on a quartz substrate, transverse propagation modes disturb the propagation of the longitudinal propagation modes. To eliminate these transverse modes, the transducers may advantageously be weighted, that is to say that, within the transducers, the overlap between interdigitated electrodes can vary. An effective weighting function may typically be an arccosine function having a maximum overlap at the center and zeros at the ends. More precisely if z is the overlap between electrodes within a transducer:

$z(x) = \arccos(x)$, where $x = 0$ at the center of the transducer.

Preferably, each resonator comprises a transducer inserted between two arrays of electrodes and, for each of the arrays, it is advantageously possible to choose an electrode period such that the reflection coefficient is centered on the central operating frequency of the resonator. In other words, this means that the propagation phase over one period is equal to 180° at the central frequency (often referred to as the Bragg frequency or synchronism frequency). This allows the Q-factor of the resonator to be optimized, while minimizing the length of the arrays.

The subject of the invention is also a remotely interrogable surface acoustic wave temperature/pressure sensor which further includes a third resonator having a surface acoustic wave propagation direction parallel to that of the first transducer and means for applying pressure to said third transducer.

According to one variant of the invention, the sensor is characterized in that:

the periods of the first, second and third reflector arrays are equal to 3.62 μm, 3.69 μm and 3.62 μm, respectively, and the periods of the first, second and third transducers are equal to 3.60, 3.67 and 3.60 μm, respectively;

the distances between reflector arrays and transducers are equal to 3.28 μm and 3.28 μm in the first resonator, 3.82 μm and 2.85 μm in the second resonator, and 3.27 μm and 3.27 μm in the third resonator, respectively;

the aperture of the transducers within the three resonators is equal to 350 μm;

the number of electrodes within the reflector arrays is equal to 270, 360 and 270, respectively; and the number of electrodes within the transducers is equal to 136, 164 and 136, respectively.

The subject of the invention is also a pressure/temperature measurement device comprising a sensor according to the invention and a remote interrogation system.

The invention will be more clearly understood and other advantages will become apparent thanks to the following description and to the appended figures in which:

FIGS. 7 and 8 illustrate arccosine weighting functions that can be used in a sensor according to the invention; and FIG. 9 illustrates the variation in directivity as a function of the angle of propagation within the inclined resonator, in one example of a sensor according to the invention.

Figure 1:
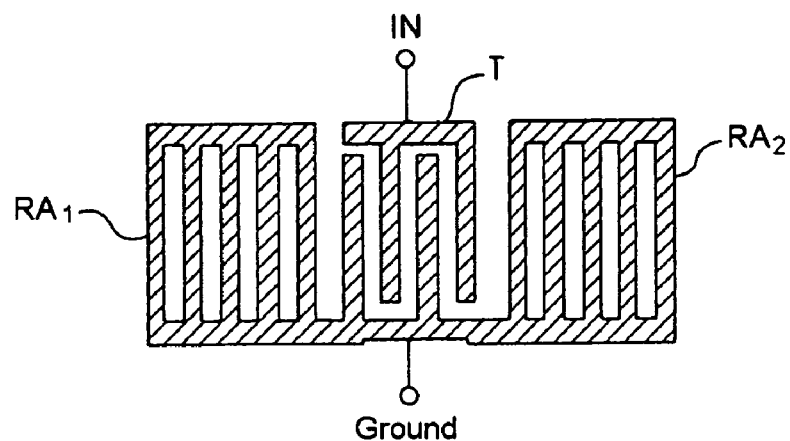
FIG. 1 shows schematically the structure of a surface acoustic wave resonator of small bandwidth according to the known art.
Figure 2:
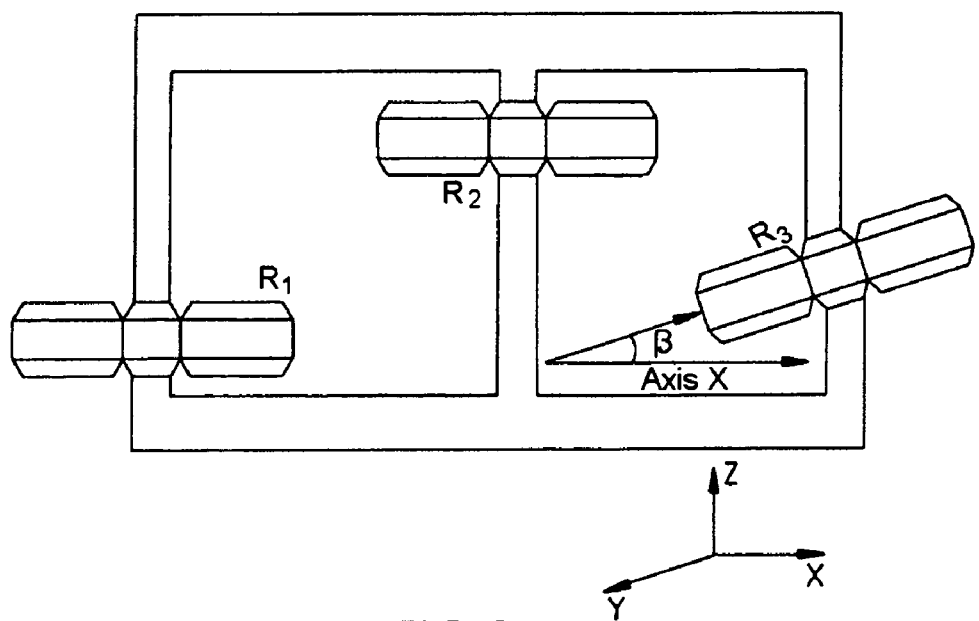
FIG. 2 illustrates a remotely interrogable pressure/temperature sensor according to the prior art.
Figure 3:
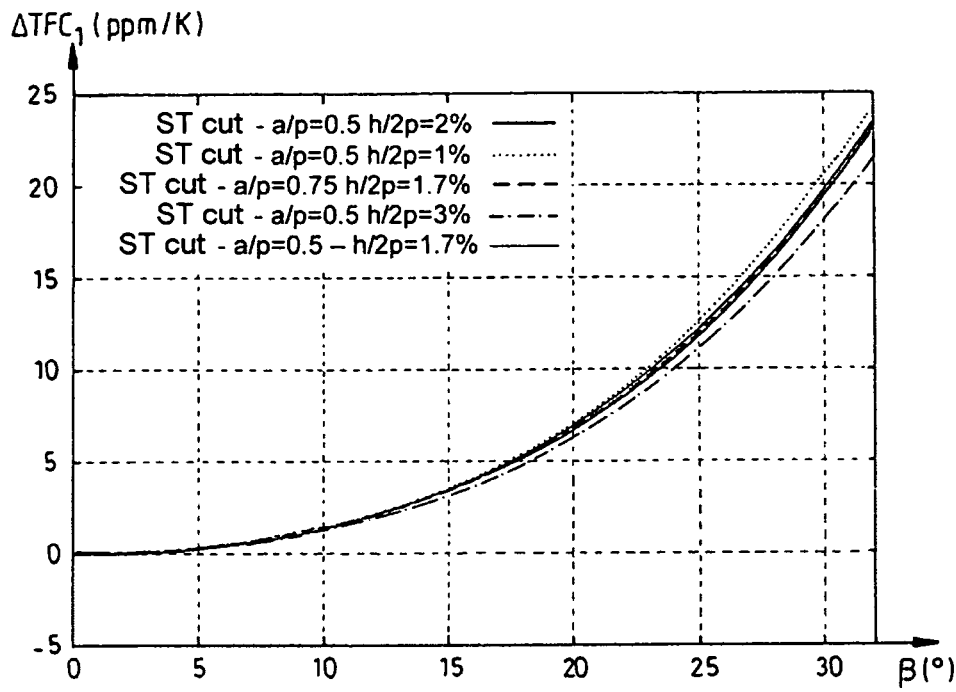
FIG. 3 illustrates the variations in difference $\Delta FTC_1$ for various operating points (thickness/degree of metallization) and for various angles of cut.
Figure 4:
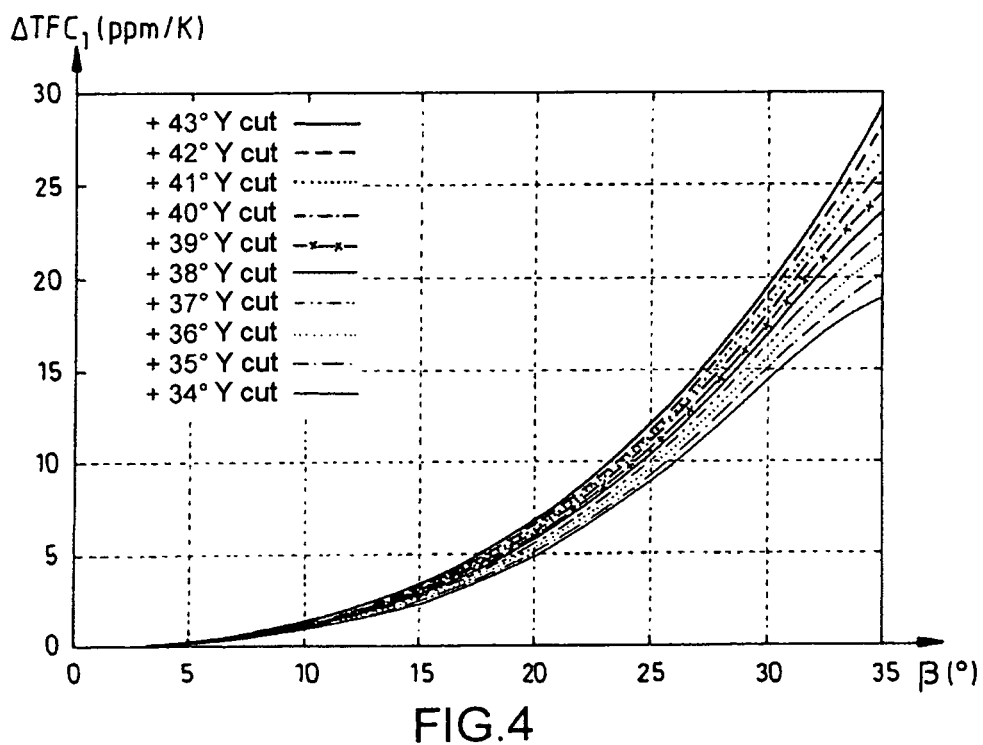
FIG. 4 illustrates the variations in the differences $\Delta FTC_1$ for various angles of cut and various angles of propagation.
Figure 5:
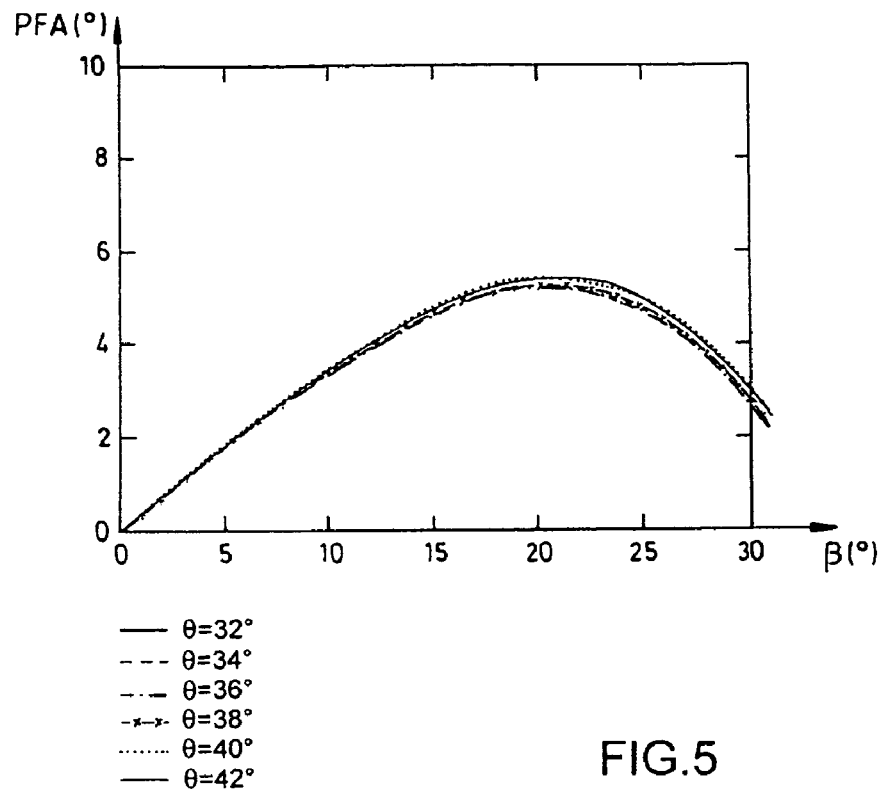
FIG. 5 illustrates the flow angle divergence within an inclined resonator in a sensor according to the invention as a function of the angle of propagation for various angles of cut.

In general, the sensor according to the invention may comprise three resonators, such as the resonator shown in FIG. 1, called respectively $T_{1,SAW}$ in the case of the reference resonator, $P_{SAW}$ in the case of the resonator subjected to pressure variations and $T_{2,SAW}$ in the case of the resonator intended for temperature measurements, in a configuration identical to that illustrated in FIG. 2 with $R_1 \rightarrow T_{1,SAW}$, $R_2 \rightarrow P_{SAW}$ and $R_3 \rightarrow T_{2,SAW}$.

It should be noted that the resonator $P_{SAW}$ is not essential—a remotely interrogable temperature sensor may simply be produced.

These three resonators are connected together in parallel, as illustrated in FIG. 2, and also connected to an antenna.

Figure 6:
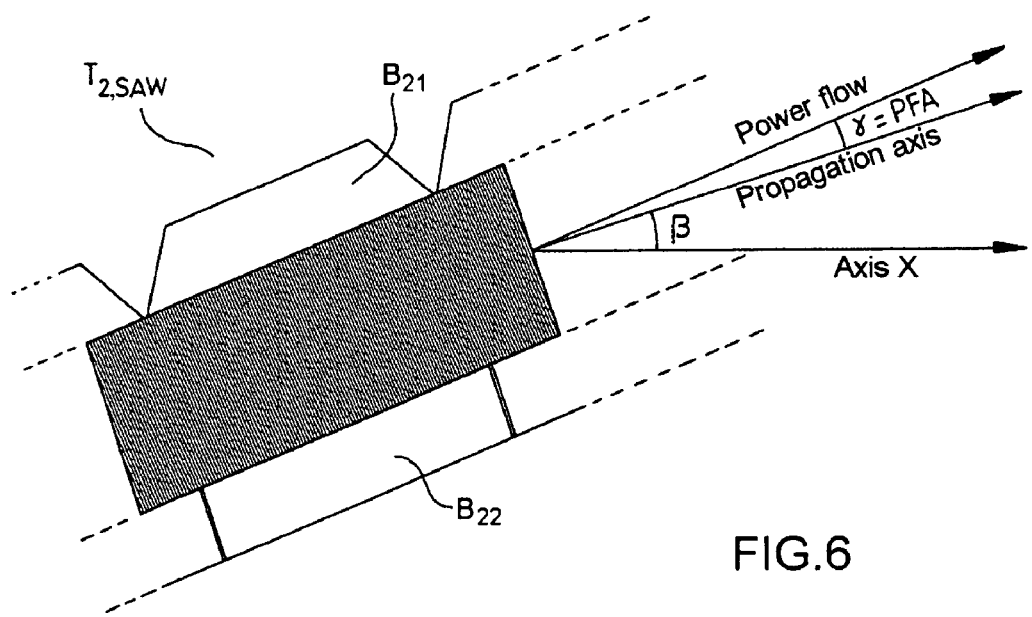
FIG. 6 illustrates the inclined resonator of the sensor according to the invention and its control buses oriented in order to optimize the acoustic power.

The resonators $T_{1,SAW}$ and $P_{SAW}$ are placed on the substrate along the X axis and the resonator $T_{2,SAW}$ is placed along the X' direction, which makes an angle $\beta$ with the X direction. The control buses $B_{21}$ and $B_{22}$ for the interdigitated electrodes of the resonator $T_{2,SAW}$ are inclined at an angle $\gamma$ to the angle $\beta$ so as to use all of the power flow within said third resonator, as illustrated in FIG. 6.

EXEMPLARY EMBODIMENT OF A SENSOR ACCORDING TO THE INVENTION OPERATING IN THE ISM BAND

In this exemplary embodiment, the three resonators are placed so as to operate at different frequencies, the nominal frequencies being 434.26 MHz, 433.83 MHz and 433.28 MHz respectively. This choice makes it possible both to be not outside the ISM band (433.05 MHz to 434.79 MHz) and to make the three frequencies as far apart as possible. The measurement principle is based on a measurement of the frequency difference between two resonators. The first resonator $T_{1,SAW}$ provides a reference frequency. The pressure measurement is obtained by subjecting only the resonator $P_{SAW}$ to a pressure. There are several means of pressurizing the resonator. One of the means is to not support the resonator and to press on top with the cover. Since the resonators $T_{1,SAW}$ and $P_{SAW}$ are at the same temperature, the frequency difference obtained for these two resonators is only proportional to the applied pressure. The resonators are produced on a quartz substrate of Y+34° cut. The propagation direction used is the X direction in the case of the resonators $T_{1,SAW}$ and $P_{SAW}$. The direction used for the resonator $T_{2,SAW}$ is X+18°. It should be clearly noted that quartz is symmetrical with respect to the X axis, which means that the angles $\beta$ and $-\beta$ are equivalent. The resonator $T_{2,SAW}$ could therefore be replaced, without any change in properties, with a resonator symmetrical with respect to X+90°, that is to say along the X+162° axis. This is equivalent to providing symmetry with respect to the X axis and then making the device rotate through 180°.

All the resonators obey a quadratic frequency-temperature dependent law with a second-order coefficient that may be considered to be the same. In contrast, the turnover temperature of the frequency-temperature curve depends on the angle of propagation. This temperature is −25° C. in the case of the resonators $T_{1,SAW}$ and $P_{SAW}$, while it is +25° C. in the case of the resonator $T_{2,SAW}$. The frequency difference between the resonators $T_{1,SAW}$ and $T_{2,SAW}$ is therefore proportional to the temperature, thereby allowing the temperature to be measured.

To eliminate the transverse modes, the transducers are weighted with a cosine-type weighting factor, that is to say that the overlap lengths of the electrodes are made to vary according to an arccosine function having a maximum at the center and zeros at the ends. This weighting factor allows only the principal mode to be coupled.

Figure 7:
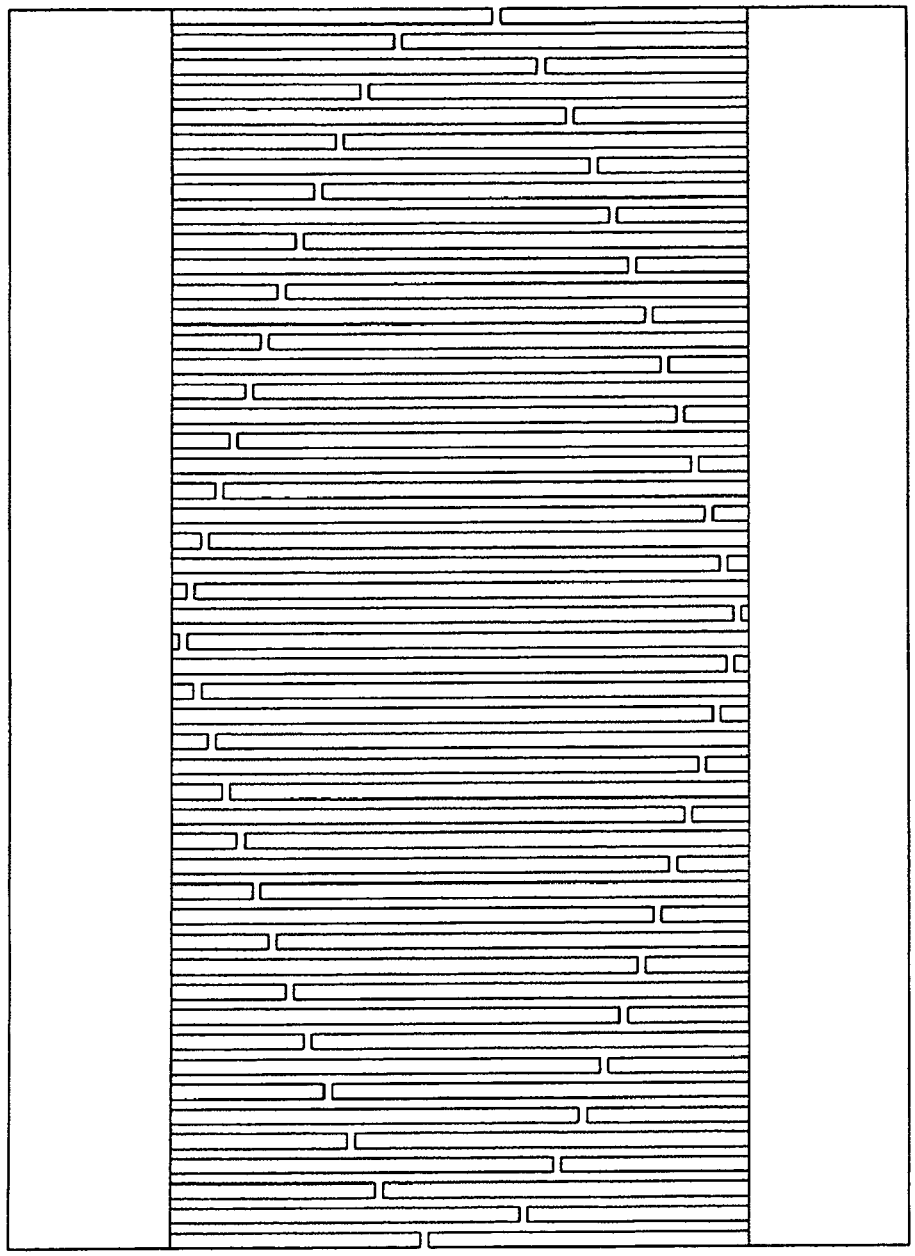

FIGS. 7 and 8 illustrate two types of arccosine function, a symmetrical function and an antisymmetric function respectively, which may advantageously be used in a sensor according to the invention.

Choice of the Periods of the Arrays and Transducers

One way of designing the sensor is described below:

For each resonator, an array period is chosen such that the reflection coefficient of the arrays is centered on the central frequency intended for the resonator.

For the resonators $T_{1,SAW}$ and $P_{SAW}$, the distances between the ends of the electrodes of the arrays and those of the transducers are chosen so as to maximize the coupling of the transducer with the resonant cavity. Typically, the optimum shift of the reflectors with respect to the arrays may be equal to 0.45λ. This shift is understood as the distance that is added between arrays and transducers. In other words, if $P_a$ is the period of the array and $P_t$ the period in the transducer, the distance between the two adjacent electrodes of the array and of the transducer is:

$$\frac{P_a + P_t}{2} + 0.45\lambda.$$

When the angle of propagation is not zero and therefore, in the case of the resonator $T_{2,SAW}$, the two propagation directions are not equivalent and there exists a phase between reflection coefficient and transduction. This physical effect, often called the NSPUDT effect, is due to the anisotropy of the crystals. It is equivalent to considering that the center of reflection of a reflective electrode is not at the center of the electrode but slightly offset. When the phase of the wave reflected off an array is examined, a different value is obtained depending on whether the transmitted wave is transmitted to the left (and therefore reflected to the right) or vice-versa. If this effect is not properly compensated for in the design of the resonators, it results in the appearance of undesirable parasitic modes. To eliminate these modes, the array on the left is offset differently from the array on the right so as to obtain an identical phase on both sides between the center of transduction (i.e. the center of the last active electrode of the transducer and the center of reflection) which depends on which side the array is. This directivity depends strongly on the cut, on the angle of propagation and above all on the point of operation used (metal thickness, degree of metallization). This directivity may be measured or calculated using, for example, a method of the FEM/BEM [1] type. The reader may advantageously refer to the article by P. Ventura et al., "A new accurate analysis of periodic IDTs built on unconventional orientation on quartz", 1997, IEEE Ultrasonics Symp., pp 139-142. An example of the variation of this angle of directivity is given by FIG. 9 for an angle of cut of 42.75°, an a/p ratio of 0.75, an h/2p ratio of 1.6% and a period of 3.756 μm.

To compensate for this effect, it is necessary to have a different distance between arrays and transducer on the righthand side and the left-hand side. This distance is optimized so as to eliminate the parasitic modes that would appear if the compensation is not correct. When the degrees of metallization are the same on the arrays and the transducer, it has been found that, to compensate for this effect, it is necessary to increase the distance between the extreme electrode of one array and that of the facing transducer by $$\frac{\lambda}{2} \cdot \frac{\varphi}{360}$$

($\varphi$ being in degrees) on one side and by reducing this distance by the same amount on the other side. The shifts between arrays and transducers are thus equal to $$0.45\lambda + \frac{\lambda}{2} \cdot \frac{\varphi}{360}$$

and $$0.45\lambda - \frac{\lambda}{2} \cdot \frac{\varphi}{360},$$

respectively. In these expressions, $\varphi$ is the directivity in degrees, which is defined in the aforementioned reference. This directivity may be expressed by the phase of the reflection coefficient on a reflective electrode which is (with a phase reference at the center of the electrode):

$$R_{left} = -jr \exp(-2jf)$$

$$R_{right} = -jr \exp(2jf).$$

Resonator $T_{2,SAW}$ and Compensation of the Power Flow Angle

For the direction X+18°, the power flow direction and the wavevector direction differ by an angle of 5.3°. This effect is compensated for by choosing to produce buses that are not perpendicular to the electrodes, in accordance with the invention. The angle between buses and electrodes is now 18°+5.3°=23.3°. This makes it possible to have the boundaries of the transducer along the power flow direction, whereas the electrodes are perpendicular to the wavevector.

Number of Electrodes of the Transducers and Aperture

The number of electrodes of the transducers and their aperture are chosen so as to have an impedance close to 50 ohms. This allows the electromagnetic energy retransmitted by the sensor to be maximized.

Table summarizing the data for the optimized sensor

| Resonator | Propagation direction | Array period (μm) | Transducer period (μm) | Offset (μm) | Number of electrodes | Aperture (μm) |
|---|---|---|---|---|---|---|
| $P_{SAW}$ | X | 3.62 | 3.60 | 3.27 | $N_r = 270$, $N_t = 136$ | 350 |
| $T_{1,SAW}$ | X | 3.62 | 3.60 | 3.28 | $N_r = 270$, $N_t = 136$ | 350 |
| $T_{2,SAW}$ | X + 18° | 3.69 | 3.67 | 3.82, 2.85 | $N_r = 360$, $N_t = 164$ | 350 |

The invention claimed is:

1. A remotely interrogable SAW (surface acoustic wave) temperature sensor comprising, on the surface of a quartz substrate cut along the direction Y' making an angle θ with the direction Y comprising:
    at least two resonators ($T_{1,SAW}$, $T_{2,SAW}$) comprising transducers including interdigitated electrodes connected to control buses of design such that they have different characteristic operating frequencies; and
    a first resonator having a first surface acoustic wave propagation direction, parallel to one of the axes of the substrate, and a second resonator having a surface acoustic wave propagation direction making a nonzero angle (β) with the propagation direction of the first resonator,
    wherein the control buses ($B_{21}$, $B_{22}$) of the second transducer are inclined at a nonzero angle (γ) to the normal to the interdigitated electrodes of said second transducer so as to compensate for the power flow divergence of the acoustic waves relative to the direction of propagation of the surface acoustic waves along said second transducer.

2. The sensor as claimed in claim 1, wherein since the operating frequency band of said sensor is bounded between a lower frequency ($F_l$) and an upper frequency ($F_u$), the characteristic operating frequencies of each of said resonators lie within said band and their difference is maximized in order to increase the sensitivity of said sensor.

3. The sensor as claimed in claim 1, wherein the substrate is a quartz crystal cut along the crystallographic axes (X,Y', Z), the Y' axis making an angle θ with the Y axis, and in that the angle of the buses to the wave propagation direction within the second resonator satisfies the following formula to within±0.5 degrees:

$$\gamma(\beta,\theta) \approx A1(\theta)\beta + A2(\theta)\beta^3 + A3(\theta)\beta^5$$

$$A1(\theta) = 0.6259 - 0.014\theta + 1.9152 \times 10^{-4}\theta^2$$

$$A2(\theta) = -5.1796 \times 10^{-4} + 1.2673 \times 10^{-5}\theta - 1.397 \times 10^{-7}\theta^2$$

$$A3(\theta) = 4.3 \times 10^{-8} - 4.8611 \times 10^{-9}\theta + 4.5141 \times 10^{-11}\theta^2.$$

4. The sensor as claimed in claim 3, wherein when the angle θ is between 30° and 40° and the angle β is between 14° and 22°, the angle γ is between 5° and 6°.

5. The sensor as claimed in claim 3, wherein at least one resonator comprises a transducer with an aperture corresponding to the extent of overlap between interdigitated electrodes, having a weighting function along the acoustic wave propagation axis in order to couple as little as possible the transverse propagation modes and therefore to reduce their influence.

6. The sensor as claimed in claim 5, wherein the weighting function is an arccosine function.

7. The sensor as claimed in claim 1, wherein each resonator comprises a transducer inserted between two reflector arrays, the periods of the arrays are such that their reflection coefficient is centered on the central frequency of said transducer.

8. The sensor as claimed in claim 1, wherein the second resonator has nonsymmetrical distances between reflector arrays and transducer.

9. The sensor as claimed in claim 8, wherein the distances between the two reflector arrays and the transducer are equal to $$0.45\lambda + \frac{\lambda}{2} \cdot \frac{\varphi}{360}$$

and $$0.45\lambda - \frac{\lambda}{2} \cdot \frac{\varphi}{360},$$

respectively, where $\lambda$ is the characteristic wavelength of the transducer and $\varphi$ is the directivity phase between the reflection coefficient and the transduction coefficient.

10. The sensor as claimed in claim 1, wherein the resonators have an impedance close or equal to 50 ohms.

11. A temperature/pressure sensor, comprising a temperature sensor as claimed in claim 1 wherein, on the substrate of said temperature sensor is a third resonator ($P_{SAW}$) and means for applying pressure to said third resonator, said resonator having a surface acoustic wave propagation direction parallel to the surface acoustic wave propagation direction of the first resonator.

12. The sensor as claimed in claim 1, wherein the resonators are connected to an antenna and are in parallel.

13. The sensor as claimed in claim 12, wherein:
the periods of the first, second and third reflector arrays are equal to 3.62 μm, 3.69 μm and 3.62 μm, respectively, and the periods of the first, second and third transducers are equal to 3.60, 3.67 and 3.60 μm, respectively;
the distances between reflector arrays and transducers are equal to 3.28 μm and 3.28 μm in the first resonator, 3.82 μm and 2.85 μm in the second resonator, and 3.27 μm and 3.27 μm in the third resonator, respectively;
the aperture of the transducers within the three resonators is equal to 350 μm;
the number of electrodes within the reflector arrays is equal to 270, 360 and 270, respectively; and
the number of electrodes within the transducers is equal to 136, 164 and 136, respectively.

14. A pressure/temperature measurement device comprising a sensor as claimed in claim 1 and a remote interrogation system.

* * * * *